US011955276B2

(12) United States Patent
Sekiguchi et al.

(10) Patent No.: US 11,955,276 B2
(45) Date of Patent: Apr. 9, 2024

(54) COIL COMPONENT

(71) Applicant: TAIYO YUDEN CO., LTD., Tokyo (JP)

(72) Inventors: Takayuki Sekiguchi, Takasaki (JP); Tsuyoshi Ogino, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 331 days.

(21) Appl. No.: 17/392,006

(22) Filed: Aug. 2, 2021

(65) Prior Publication Data

US 2021/0366637 A1 Nov. 25, 2021

Related U.S. Application Data

(63) Continuation of application No. 16/020,724, filed on Jun. 27, 2018, now Pat. No. 11,114,229.

(30) Foreign Application Priority Data

Jul. 3, 2017 (JP) ................................ 2017-130560

(51) Int. Cl.
*H01F 27/28* (2006.01)
*H01F 5/04* (2006.01)
(Continued)

(52) U.S. Cl.
CPC ................ *H01F 5/06* (2013.01); *H01F 5/04* (2013.01); *H01F 27/2852* (2013.01); *H01F 27/32* (2013.01); *H01F 41/063* (2016.01)

(58) Field of Classification Search
CPC .......... H01F 5/06; H01F 5/04; H01F 27/2852; H01F 27/32; H01F 27/2804;
(Continued)

(56) References Cited

U.S. PATENT DOCUMENTS

2007/0296536 A1* 12/2007 Odahara ............. H01F 17/0013 336/200
2008/0238601 A1* 10/2008 Das ....................... H01F 27/255 336/200

(Continued)

FOREIGN PATENT DOCUMENTS

JP H10106840 A 4/1998
JP 2004048090 A 2/2004

(Continued)

OTHER PUBLICATIONS

A Notice of Reasons for Refusal issued by the Japanese Patent Office, dated Apr. 20, 2021, for Japanese counterpart application No. 2017-130560. (4 pages).

(Continued)

*Primary Examiner* — Mang Tin Bik Lian
(74) *Attorney, Agent, or Firm* — Law Office of Katsuhiro Arai

(57) ABSTRACT

A coil component includes an insulator part and a coil part. The insulator part is constituted by an electrical insulation material, and is no more than 600 μm long and no more than 600 μm high. The coil part is wound around one axis and placed inside the insulator part. The coil part has an opening part constituted by straight line parts and curved line parts and whose shape as viewed from the one axis direction is an approximate quadrangle, wherein the line length of the curved line parts along the inner periphery of the opening part is 20% or more but no more than 40% of the line length of the inner periphery of the opening part. The coil component can satisfy both a size reduction need and the properties need.

12 Claims, 16 Drawing Sheets

(51) Int. Cl.
*H01F 5/06* (2006.01)
*H01F 27/32* (2006.01)
*H01F 41/063* (2016.01)

(58) Field of Classification Search
CPC ......... H01F 2027/2809; H01F 17/0013; H01F 27/292; H01F 2017/0066
See application file for complete search history.

(56) References Cited

U.S. PATENT DOCUMENTS

| | | | | |
|---|---|---|---|---|
| 2010/0328009 | A1* | 12/2010 | Tawa | H01F 17/0013 336/200 |
| 2011/0254650 | A1 | 10/2011 | Banno | |
| 2012/0032767 | A1* | 2/2012 | Iwasaki | H01F 27/292 336/200 |
| 2013/0200977 | A1 | 8/2013 | Miyazaki et al. | |
| 2013/0257576 | A1 | 10/2013 | Arata et al. | |
| 2013/0335185 | A1* | 12/2013 | Hahn | H01F 17/0013 336/200 |
| 2014/0028432 | A1* | 1/2014 | Yoshimori | H01F 5/00 242/437.3 |
| 2014/0375412 | A1 | 12/2014 | Seko | |
| 2016/0042862 | A1 | 2/2016 | Tachibana et al. | |
| 2016/0248450 | A1 | 8/2016 | Ishizuka | |
| 2017/0069417 | A1* | 3/2017 | Takeda | H01F 17/0013 |
| 2018/0197674 | A1* | 7/2018 | Yoshinaka | H01F 27/2885 |

FOREIGN PATENT DOCUMENTS

| | | | |
|---|---|---|---|
| JP | 2004200406 | A | 7/2004 |
| JP | 2006114626 | A | 4/2006 |
| JP | 2013045995 | A | 3/2013 |
| JP | 2013084856 | A | 5/2013 |
| JP | 2013098554 | A | 5/2013 |
| JP | 2015141945 | A | 8/2015 |
| JP | 2017022304 | A | 1/2017 |
| WO | 2007037097 | A1 | 4/2007 |
| WO | 2015068613 | A1 | 5/2015 |

OTHER PUBLICATIONS

Final Office Action issued by U.S. Patent and Trademark Office, dated Sep. 8, 2020, for U.S. Appl. No. 16/020,724 (11 pages).
Non-Final Office Action issued by U.S. Patent and Trademark Office, dated Dec. 28, 2020, for U.S. Appl. No. 16/020,724 (10 pages).
Non-Final Office Action issued by U.S. Patent and Trademark Office, dated Feb. 18, 2020, for U.S. Appl. No. 16/020,724 (14 pages).
Notice of Allowance issued by U.S. Patent and Trademark Office, dated May 18, 2021, for U.S. Appl. No. 16/020,724 (9 pages).

* cited by examiner y: length
x: width
z: height

COIL COMPONENT

CROSS-REFERENCE TO RELATED APPLICATIONS

This application is a continuation of U.S. patent application Ser. No. 16/020,724, filed Jun. 27, 2018, which claims priority to Japanese Patent Application No. No. 2017-130560, filed Jul. 3, 2017, the disclosure of each of which is herein incorporated by reference in its entirety. The applicant herein explicitly rescinds and retracts any prior disclaimers or disavowals made in any parent, child or related prosecution history with regard to any subject matter supported by the present application.

BACKGROUND

Field of the Invention

The present invention relates to a coil component having an insulator part and a coil part provided therein.

Description of the Related Art

High-frequency modules using microwave frequencies, such as mobile phones, are becoming higher in performance and smaller in size. In particular, smaller high-frequency modules require that the inductors (coil components) and other passive parts used in the modules are also made smaller.

However, a smaller inductor results in a smaller coil opening area and therefore the achieved L-value (inductance) tends to decrease. On the other hand, an attempt to increase the opening area of an inductor by bending the angled parts (corners) of the coil opening square causes the resistance value to increase and consequently the desired Q-value cannot be obtained. This explains the difficulty achieving smaller inductors offering desired properties.

Accordingly, Patent Literature 1, for example, proposes a multilayer inductor element whose multilayer coil has an inner periphery shape constituted by curved lines or straight and curved lines. It is stated that this constitution reduces concentration of electrical current at the corners and thereby achieves high Q-characteristics.

BACKGROUND ART LITERATURES

[Patent Literature 1] Japanese Patent Laid-open No. Hei 10-106840

SUMMARY

As electronic devices become increasingly smaller and thinner, the sizes of coil components installed in these electronic devices are also becoming smaller. However, smaller coil components are delivering markedly lower properties. This gives rise to a need for an art of making coil components smaller while meeting the property requirements.

In light of the aforementioned situation, an object of the present invention is to provide a coil component that can satisfy both the size reduction need and the properties need.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the coil component pertaining to an embodiment of the present invention comprises an insulator part and a coil part.

The insulator part is constituted by an electrical insulation material, and is no more than 600 μm long and no more than 600 μm high.

The coil part is wound around one axis and placed inside the insulator part.

The coil part has an opening part constituted by straight line parts and chamfered-corner line parts (also referred to as "curved line parts" which can be constituted by straight lines as described later) and whose shape as viewed from the one axis direction is an approximate rectangle, wherein the line length of the curved line parts along the inner periphery of the opening part is no more than 40% of the line length of the inner periphery of the opening part.

The curved line parts are typically provided at the corners of the inner periphery of the opening part.

The coil part may be wound around an axis running parallel with the width direction of the insulator part.

The insulator part may have a height dimension equal to or greater than its length dimension.

The insulator part may be constituted by a non-magnetic material or by a magnetic material. Preferably the insulator part is constituted by a non-magnetic material because the high-frequency characteristics can be improved further.

The insulator part may be no more than 400 μm long and no more than 300 μm high, or no more than 250 μm long and no more than 200 μm high.

As described above, according to the present invention a coil component that can satisfy both the size reduction need and the properties need can be obtained.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
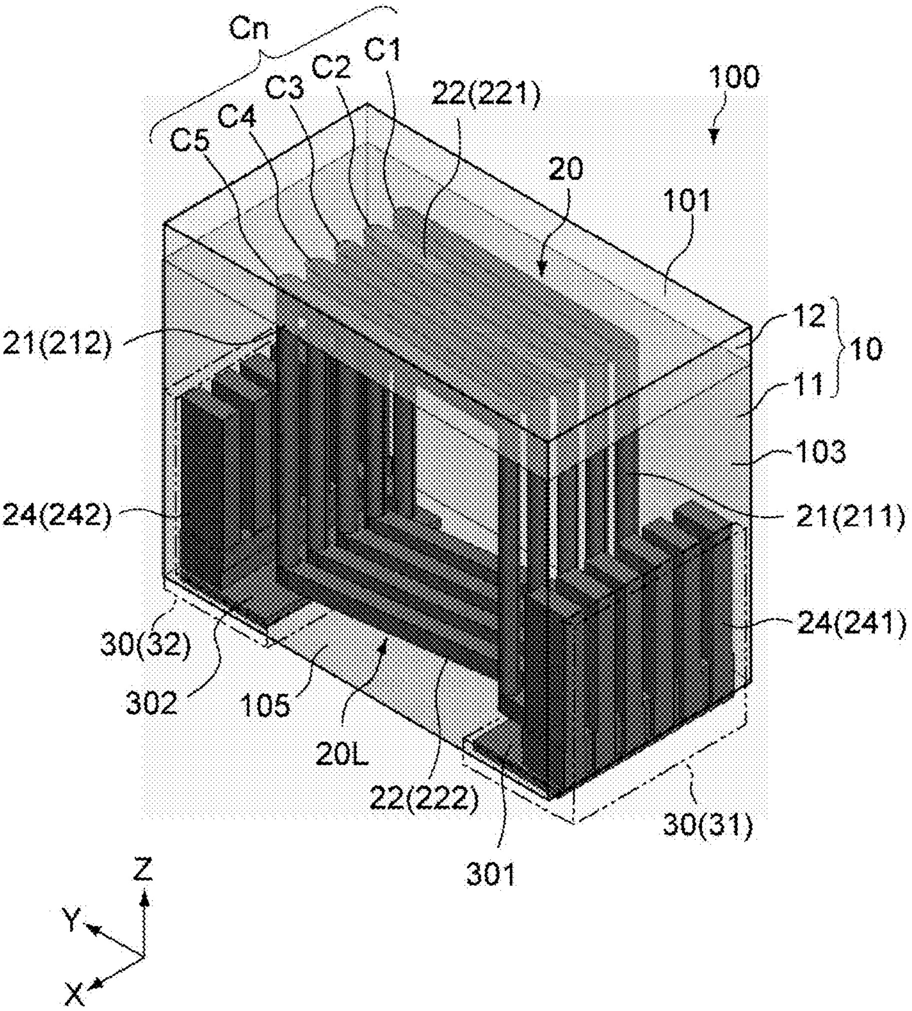
FIG. 1 is a schematic perspective oblique view showing a basic constitution of a coil component pertaining to a first embodiment of the present invention, which basic constitution is a general constitution which does not necessarily reflect features of the first embodiment whose features are explained in Constitutional Examples 1 to 5, for example.

10, 412—Insulator part
20—Internal conductor
120L, 220L, 413—Coil part
121,122, 421, 422—Straight line part
123, 124, 423—Curved line part
130—Opening part
101, 102, 400—Coil component

DETAILED DESCRIPTION OF EMBODIMENTS

Modes for carrying out the present invention are explained below by referring to the drawings.

First Embodiment

First, the basic constitution of the coil component in this embodiment, and the basic process of manufacturing the coil component, are explained.

[Basic Constitution]

Figure 2:
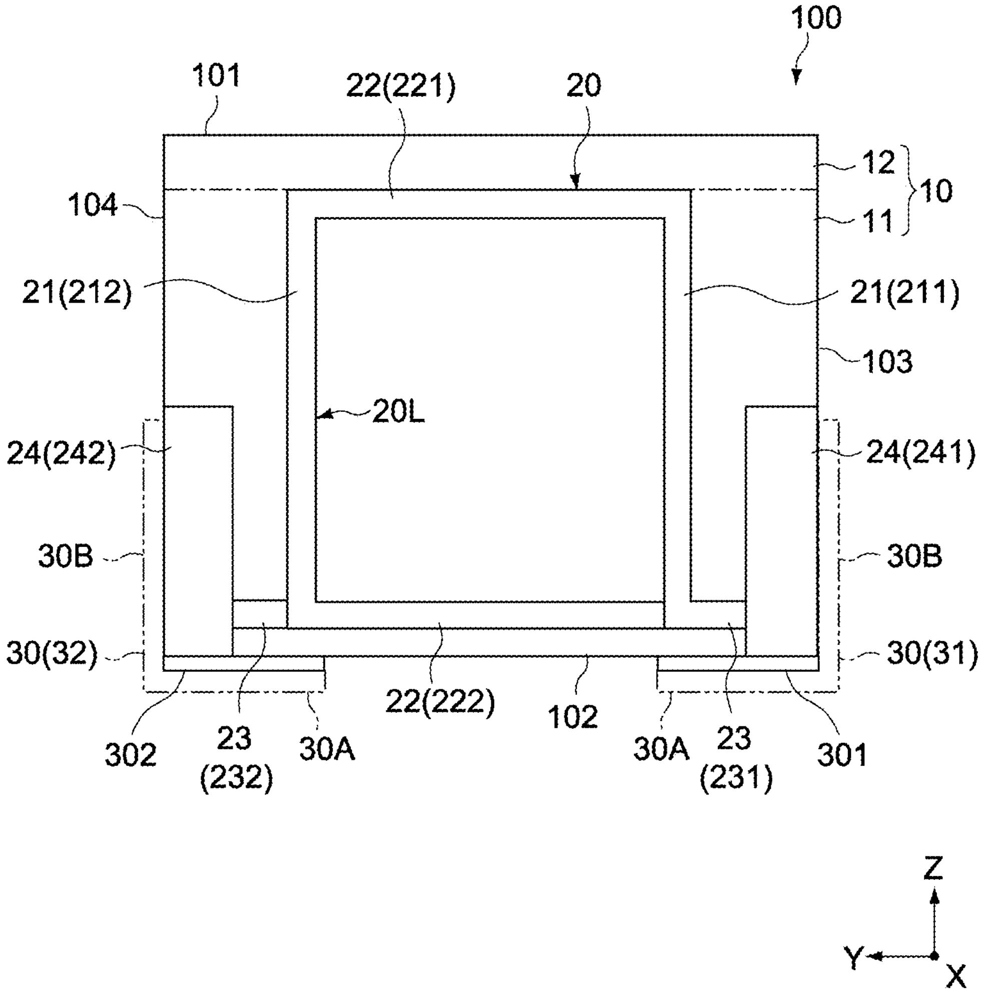
FIG. 2 is a schematic perspective side view of the coil component in FIG. 1.
Figure 3:
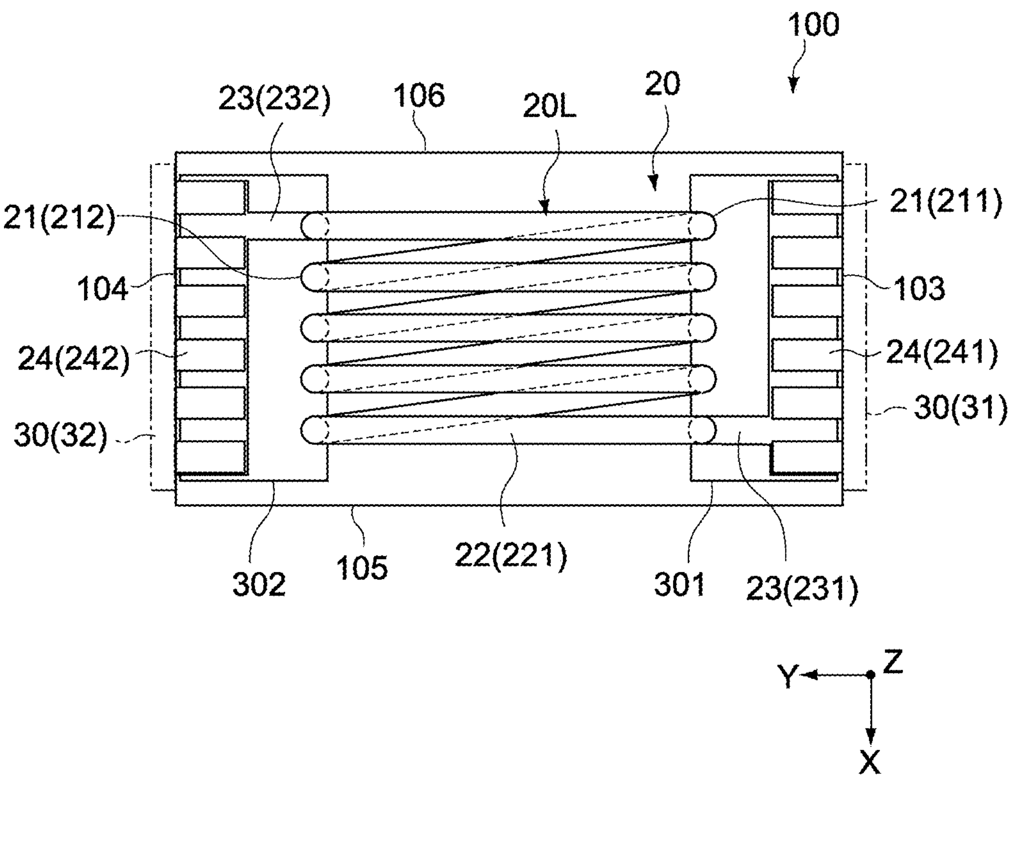
FIG. 3 is a schematic perspective top view of the coil component in FIG. 1.

FIG. 1 is a schematic perspective oblique view showing the basic constitution of the coil component, while FIG. 2 is a schematic perspective side view, and FIG. 3 is a schematic perspective top view, of the coil component.

It should be noted that, in each figure, the X-axis, Y-axis and Z-axis represent three axis directions that intersect at right angles with one another.

The coil component 100 shown has an insulator part 10, an internal conductor part 20, and external electrodes 30.

The insulator part 10 is formed as a rectangular solid shape which has a top face 101, a bottom face 102, a first end face 103, a second end face 104, a first side face 105, and a second side face 106, and which also has a width direction corresponding to the X-axis direction, a length direction corresponding to the Y-axis direction, and a height direction corresponding to the Z-axis direction. The insulator part 10 is designed so that its length (L) is 100 μm or more but no more than 600 μm, its width (W) is 50 μm or more but no more than 300 μm, and its height (H) is 50 μm or more but no more than 600 μm, for example.

The insulator part 10 has a main body part 11 and a top face part 12. The main body part 11 has the internal conductor part 20 built into it, and constitutes a key part of the insulator part 10. The top face part 12 constitutes the top face 101 of the insulator part 10. The top face part 12 may be constituted as a printed layer displaying the model number, etc., of the coil component 100, for example.

The insulator part 10 is constituted by an electrical insulation material. The main body part 11 and top face part 12 are constituted by a non-magnetic insulation material whose primarily component is resin. Constituting the insulator part 10 with a non-magnetic material allows for improvement of high-frequency characteristics.

For the insulation material constituting the main body part 11, a resin that hardens due to heat, light, chemical reaction, etc., is used, such as polyimide, epoxy resin, liquid crystal polymer, etc., for example. On the other hand, the top face part 12 may be constituted by a resin film, etc., in addition to the aforementioned materials. Alternatively, the insulator part 10 may be constituted by glass or other ceramic materials.

For the insulator part 10, a composite material constituted by a resin that contains a filler may be used. For the filler, typically silica, alumina, zirconia, and other ceramic grains are used. The ceramic grains are not limited in shape in any way, and although they are typically spherical, their shape is not limited to this and may be needle-like, scale-like, etc.

The internal conductor part 20 is provided inside the insulator part 10. The internal conductor part 20 has multiple columnar conductors 21 and multiple connecting conductors 22, and these multiple columnar conductors 21 and connecting conductors 22 together constitute a coil part 20L that winds around an axis running parallel with the X-axis direction.

The multiple columnar conductors 21 are each formed in roughly cylindrical shape, having a center of axis (coil axis) running parallel with the Z-axis direction. The multiple columnar conductors 21 are constituted by two conductor groups that are facing each other in roughly the Y-axis direction. First columnar conductors 211 that constitute one of these conductor groups are arranged in the X-axis direction at prescribed intervals, while second columnar conductors 212 that constitute the other conductor group are also arranged in the X-axis direction at prescribed intervals.

It should be noted that the "roughly cylindrical shape" includes not only a columnar body whose cross-sectional shape in the direction perpendicular to the axis (direction perpendicular to the center of axis) is a circle, but also a columnar body whose cross-sectional shape as defined above is an ellipse or elongated circle, where an ellipse or elongated circle refers to one having a ratio of long axis to short axis of 3 or less, for example.

The first and second columnar conductors 211, 212 are constituted with the roughly same diameter and roughly same height, respectively. In the illustrated example, there are five first columnar conductors 211 and five second columnar conductors 212. As described below, the first and second columnar conductors 211, 212 are constituted by stacking multiple via conductors in the Z-axis direction.

It should be noted that "roughly same diameter" is adopted to keep the resistance from increasing, and means that any dimensional variation as viewed from the same direction is within 10%, for example; whereas "roughly same height" is adopted to ensure stacking accuracy of each layer, and means that any variation in height is within ±10 μm, for example.

The multiple connecting conductors 22 are formed in parallel with the XY plane, and constituted by two conductor groups that are facing each other in the Z-axis direction. First connecting conductors 221 that constitute one of these conductor groups extend along the Y-axis direction, are arranged at intervals in the X-axis direction, and interconnect the first and second columnar conductors 211, 212, respectively. Second connecting conductors 222 that constitute the other conductor group extend in a manner inclining at a prescribed angle to the Y-axis direction, are arranged at intervals in the X-axis direction, and interconnect the first and second columnar conductors 211, 212, respectively. In the illustrated example, the first connecting conductors 221 are constituted by five connecting conductors, while the second connecting conductors 222 are constituted by four connecting conductors.

In FIG. 1, the first connecting conductors 221 are connected to the top edges of prescribed pairs of columnar conductors 211, 212, while the second connecting conductors 222 are connected to the bottom edges of prescribed pairs of columnar conductors 211, 212. To be more specific, the first and second columnar conductors 211, 212 and first and second connecting conductors 221, 222 constitute loop parts Cn (C1 to C5) of the coil part 20L, and these circumferential parts Cn are connected to each other in a manner drawing rectangular spirals around the X-axis direction. As a result, a coil part 20L having a center of axis (coil axis) in the X-axis direction, and an opening of rectangular shape is formed inside the insulator part 10.

In this embodiment, the circumferential parts Cn are constituted by five circumferential parts C1 to C5. The opening of each circumferential part C1 to C5 is formed roughly in the same shape.

The internal conductor part 20 further has lead parts 23 and comb block parts 24, and the coil part 20L is connected to the external electrodes 30 (31, 32) via these parts.

The lead parts 23 have a first lead part 231 and a second lead part 232. The first lead part 231 is connected to the bottom edge of the first columnar conductor 211 constituting one end of the coil part 20L, while the second lead part 232 is connected to the bottom edge of the second columnar conductor 212 constituting the other end of the coil part 20L. The first and second lead parts 231, 232 are arranged on the same XY plane as the second connecting conductor 222, and formed in parallel with the Y-axis direction.

The comb block parts 24 have first and second comb block parts 241, 242 that are arranged in a manner facing each other in the Y-axis direction. The first and second comb block parts 241, 242 are arranged with the tips of the respective comb tooth parts facing up in FIG. 1. The comb block parts 241, 242 are partially exposed on the two end faces 103, 104 and bottom face 102 of the insulator part 10. The first and second lead parts 231, 232 are connected between prescribed comb tooth parts of the first and second comb block parts 241, 242 (refer to FIG. 3). Conductor layers 301, 302 that constitute the base layers of the external electrodes 30 are provided at the bottom parts of the first and second comb block parts 241, 242 (refer to FIG. 2).

The external electrodes 30 constitute external terminals for surface mounting, and have first and second external electrodes 31, 32 that are facing each other in the Y-axis direction. The first and second external electrodes 31, 32 are formed in prescribed areas on the exterior face of the insulator part 10.

To be more specific, the first and second external electrodes 31, 32 have, as shown in FIG. 2, first parts 30A that cover both end parts, in the Y-axis direction, of the bottom face 102 of the insulator part 10, and second parts 30B that cover both end faces 103, 104 of the insulator part 10 across a prescribed height. The first parts 30A are electrically connected to the bottom parts of the first and second comb block parts 241, 242 via the conductor layers 301, 302. The second parts 30B are formed on the end faces 103, 104 of the insulator part 10 in a manner covering the comb tooth parts of the first and second comb block parts 241, 242.

The columnar conductors 21, connecting conductors 22, lead parts 23, comb block parts 24 and conductor layers 301, 302 are each constituted by a metal material such as Cu (copper), Al (aluminum), or Ni (nickel), for example, and in this embodiment they are all constituted by plating layers of copper or alloy thereof. The first and second external electrodes 31, 32 are constituted by Ni/Sn plating, for example.

Figure 4:
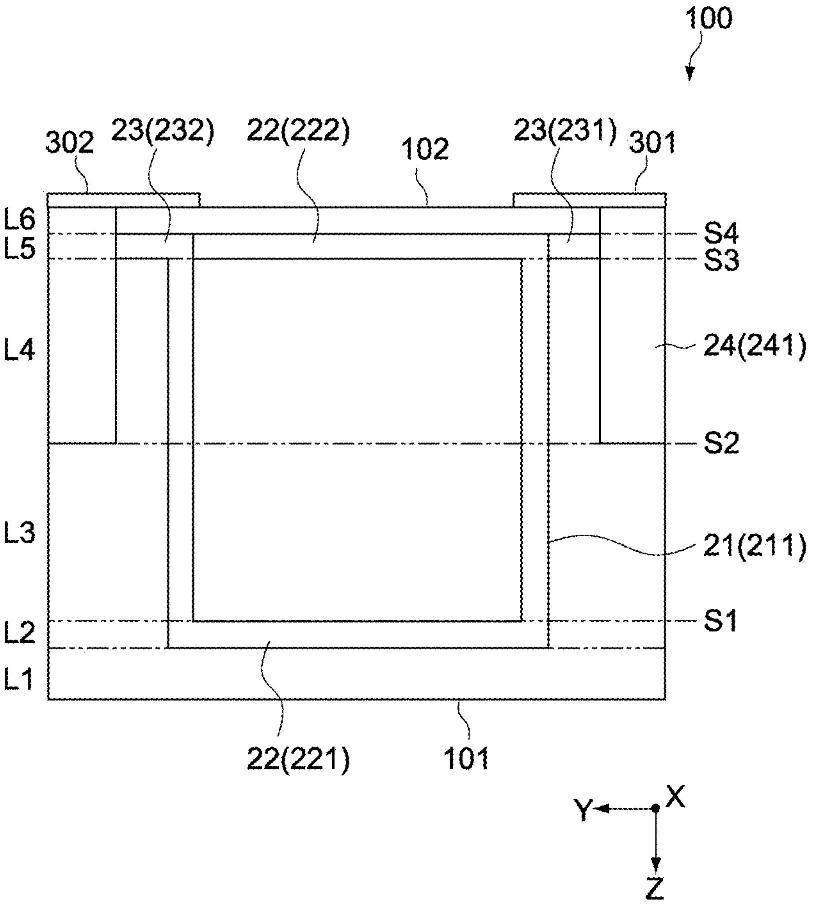
FIG. 4 is a schematic perspective side view showing the coil component in FIG. 1 placed upside down.

FIG. 4 is a schematic perspective side view showing the coil component 100 placed upside down. The coil component 100 is constituted by a laminate of a film layer L1 and multiple electrode layers L2 to L6, as shown in FIG. 4. In this embodiment, it is produced by stacking the film layer L1 and electrode layers L2 to L6 in the Z-axis direction one by one from the top face 101 toward the bottom face 102. The number of layers is not limited in any way, and the explanations provided herein assume six layers.

The film layer L1 and electrode layers L2 to L6 each include the elements, of the insulator part 10 and internal conductor part 20, constituting the applicable layer. FIGS. 5A to 5F are schematic top views of the film layer L1 and electrode layers L2 to L6 in FIG. 4.

Figure 5A:
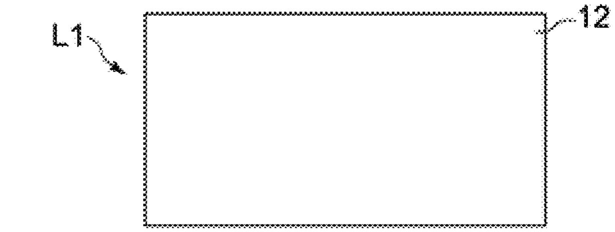
FIGS. 5A to 5F are schematic top views of each electrode layer constituting the coil component in FIG. 1.
Figure 5B:
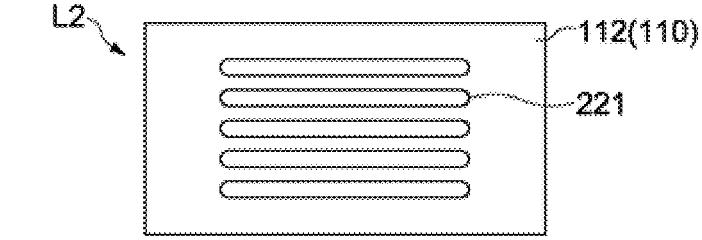
Figure 5C:
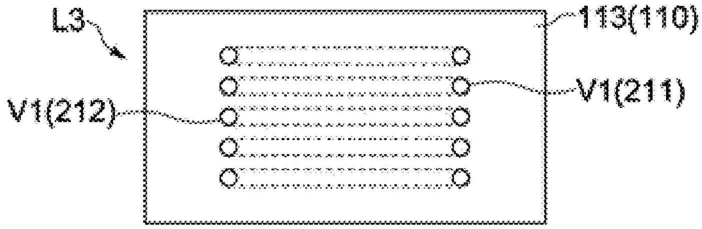
Figure 5D:
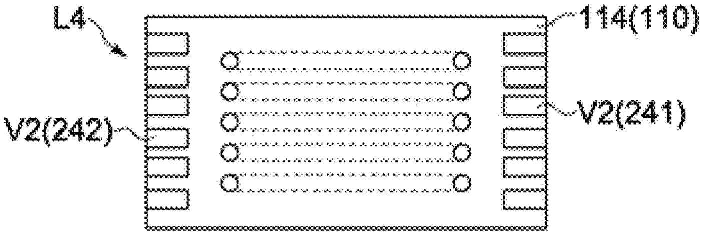
Figure 5E:
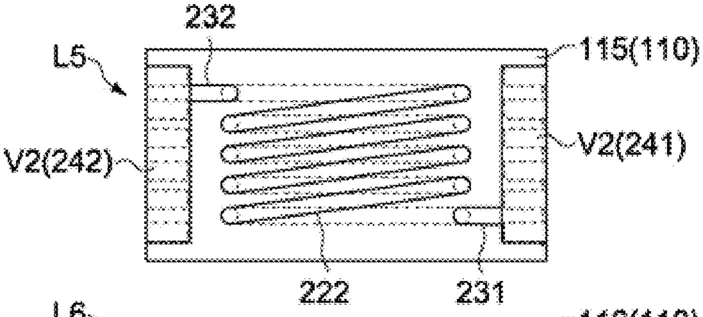
Figure 5F:
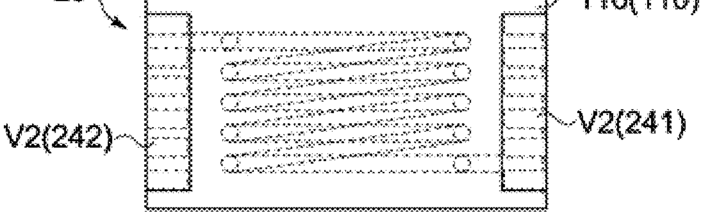

The film layer L1 is constituted by the top face part 12 that forms the top face 101 of the insulator part 10 (FIG. 5A). The electrode layer L2 includes an insulation layer 110 (112) that constitutes a part of the insulator part 10 (main body part 11), and the first connecting conductors 221 (FIG. 5B). The electrode layer L3 includes an insulation layer 110 (113), and via conductors V1 that constitute parts of the columnar conductors 211, 212 (FIG. 5C). The electrode layer L4 includes an insulation layer 110 (114), the via conductors V1, as well as via conductors V2 that constitute parts of the comb block parts 241, 242 (FIG. 5D). The electrode layer L5 includes an insulation layer 110 (115), the via conductors V1, V2, as well as the lead parts 231, 232 and second connecting conductors 222 (FIG. 5E). And, the electrode layer L6 includes an insulation layer 110 (116) and the via conductors V2 (FIG. 5F).

The electrode layers L2 to L6 are stacked in the height direction via joining surfaces S1 to S4 (FIG. 4). Accordingly, the insulator layers 110 and via conductors V1, V2 have boundary parts also in the height direction. And, the coil component 100 is manufactured according to the build-up method in which the electrode layers L2 to L6 are produced and stacked one by one, starting from the electrode layer L2.

[Basic Manufacturing Process]

Next, the basic process of manufacturing the coil component 100 is explained. For example, multiple coil components 100 may be produced simultaneously at the wafer level and then divided into individual elements (chips) after production.

FIGS. 6A to 8D are schematic cross-sectional views of the element unit area, explaining some of the steps to manufacture the coil component 100. A specific manufacturing method is to attach onto a support substrate S a resin film 12A (film layer L1) that will constitute the top face part 12, and then produce electrode layers L2 to L6 one by one on top. For the support substrate S, a silicon, glass, or sapphire substrate is used, for example. Typically, conductor patterns that will constitute the internal conductor part 20 are produced according to the electroplating method, after which these conductor patterns are covered by an insulation resin material to produce an insulation layer 110, and these steps are implemented repeatedly.

FIGS. 6A to 7D show the steps to manufacture the electrode layer L3.

Figure 6A:
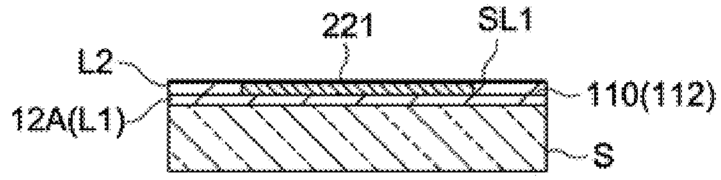
FIGS. 6A to 6E are schematic cross-sectional views of the element unit area, showing basic steps of manufacturing the coil component in FIG. 1.

In these steps, first a seed layer (power supply layer) SL1 for electroplating is formed on the surface of the electrode layer L2 according to the sputtering method, etc., for example (FIG. 6A). The seed layer SL1 is not limited in any way so long as it is made of a conductive material, and it may be constituted by Ti (titanium) or Cr (chromium), for example. The electrode layer L2 includes the insulation layer 112 and connecting conductors 221. The connecting conductors 221 are provided on the bottom face of the insulation layer 112 in a manner contacting the resin film 12A.

Figure 6B:
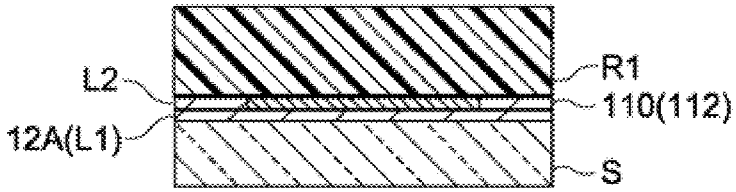
Figure 6C:
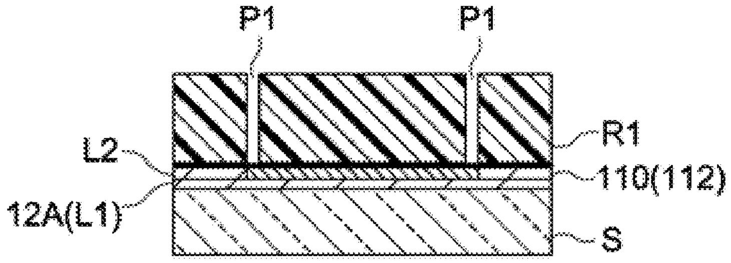
Figure 6D:
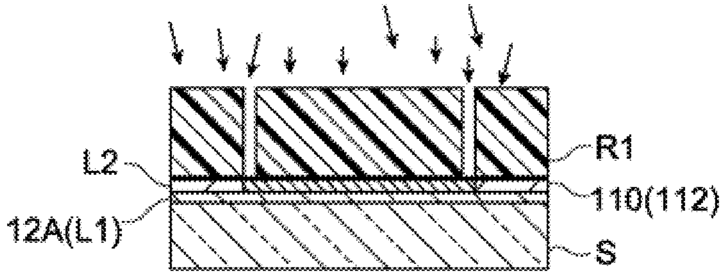

Next, a resist film R1 is formed on the seed layer SL1 (FIG. 6B). As the resist film R1 undergoes a series of treatments including exposure and development, a resist pattern having multiple opening parts P1 that correspond to via conductors V13 constituting parts of the columnar conductors 21 (211, 212) is formed (FIG. 6C). Thereafter, a de-scumming treatment to remove the residues of resist inside the opening parts P1 is performed (FIG. 6D).

Figure 6E:
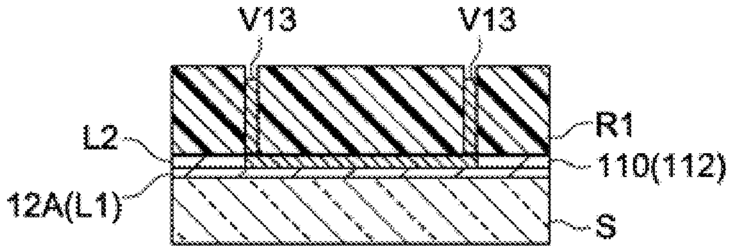
Figure 7A:
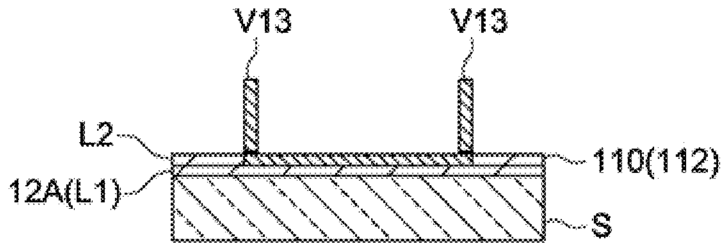
FIGS. 7A to 7D are schematic cross-sectional views of the element unit area, showing basic steps of manufacturing the coil component in FIG. 1.
Figure 7B:
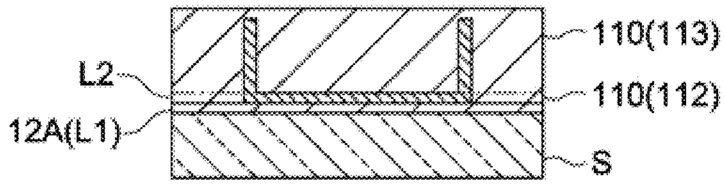
Figure 7C:
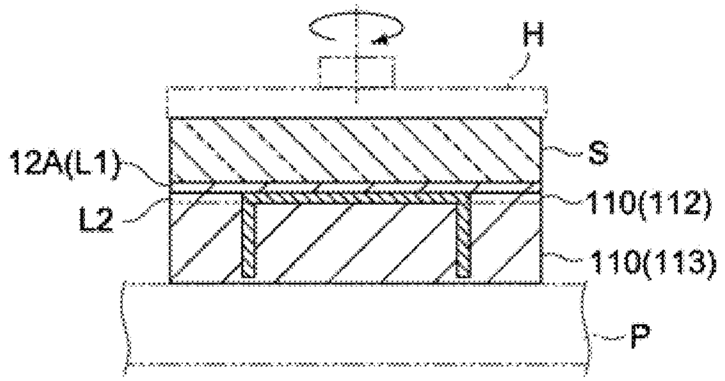

Next, the support substrate S is immersed in a Cu plating bath, and voltage is applied to the seed layer SL1, so that multiple via conductors V13 constituted by Cu plating layers are formed inside the opening parts P1 (FIG. 6E). Then, following the removal of the resist film R1 and seed layer SL1 (FIG. 7A), the insulation layer 113 to cover the via conductors V13 is formed (FIG. 7B). The insulation layer 113 is a resin material which is printed or applied, or a resin film which is attached, onto the electrode layer L2 and then cured. The surface of the cured insulation layer 113 is then polished using a CMP (chemical mechanical polisher), grinder, or other polishing machine until the tips of the via conductors V13 are exposed (FIG. 7C). FIG. 7C shows an example of how the support substrate S is set upside down on a self-rotatable polishing head H and the insulation layer 113 is polished (CMP) with a revolving polishing pad P.

Figure 7D:
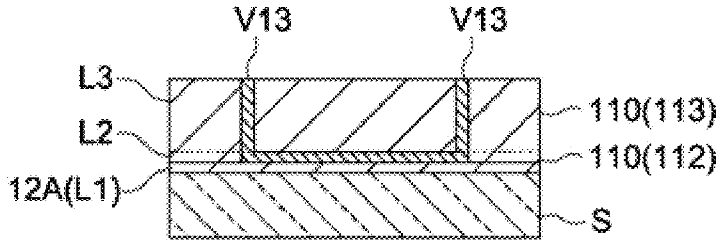

As a result of the above, the electrode layer L3 is produced on the electrode layer L2 (FIG. 7D).

It should be noted that, although how the insulation layer 112 is formed was not described, typically the insulation layer 112 is also produced in the same manner as the insulation layer 113 is produced, which involves printing, applying or attaching, and then curing, followed by polishing with a CMP (chemical mechanical polisher), grinder, etc.

The electrode layer L4 is then produced on the electrode layer L3 in the same manner.

First, multiple via conductors (second via conductors) to be connected to the multiple via conductors V13 (first via conductors) are formed on the insulation layer 113 (second insulation layer) of the electrode layer L3. To be specific, a seed layer that will cover the surface of the first via conductors is formed on the surface of the second insulation layer, after which a resist pattern with opening areas corresponding to the surfaces of the first via conductors is formed on the seed layer, and then the second via conductors are formed according to the electroplating method using the resist pattern as a mask. Next, a third insulation layer that will cover the second via conductors is formed on the second insulation layer. Thereafter, the surface of the third insulation layer is polished until the tips of the second via conductors are exposed.

It should be noted that, in the aforementioned step to form the second via conductors, via conductors V2 that will constitute parts of the comb block parts 24 (241, 242) are also formed at the same time (refer to FIGS. 4 and 5D). In this case, the formed resist pattern above is a resist pattern having openings corresponding to the areas where the second via conductors are formed and also the areas where the via conductors V2 are formed.

FIGS. 8A to 8D show parts of the steps to manufacture the electrode layer L5.

Figure 8A:
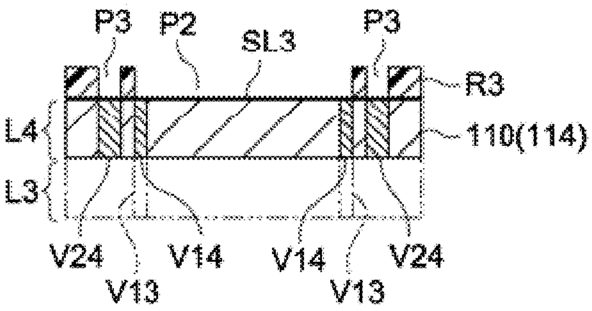
FIGS. 8A to 8D are schematic cross-sectional views of the element unit area, showing basic steps of manufacturing the coil component in FIG. 1.
Figure 8B:
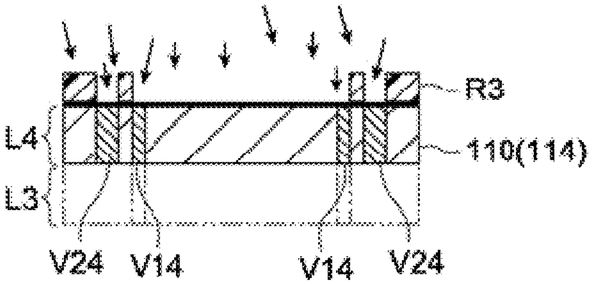

Here, too, a seed layer SL3 for electroplating, and a resist pattern (resist film R3) having opening parts P2, P3, are formed one by one on the surface of the electrode layer L4 (FIG. 8A). Thereafter, a de-scumming treatment to remove the residues of resist inside the opening parts P2, P3 may be performed (FIG. 8B), as necessary.

The electrode layer L4 has an insulation layer 114 and via conductors V14, V24. The via conductors V14 correspond to the via conductors (V1) that constitute parts of the columnar conductors 21 (211, 212), while the via conductors V24 correspond to the via conductors (V2) that constitute parts of the comb block parts 24 (241, 242) (refer to FIGS. 5C and 5D). The opening parts P2 face the via conductors V14 inside the electrode layer L4 via the seed layer SL3, while the opening parts P3 face the via conductors V24 inside the electrode layer L4 via the seed layer SL3. The opening parts P2 are formed in shapes corresponding to the respective connecting conductors 222.

Figure 8C:
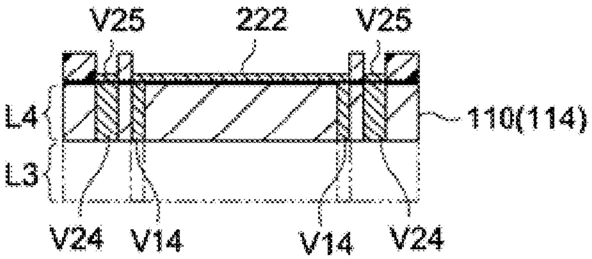

Next, the support substrate S is immersed in a Cu plating bath, and voltage is applied to the seed layer SL3, so that via conductors V25 and connecting conductors 222, each constituted by a Cu plating layer, are formed inside the opening parts P2, P3 (FIG. 8C). The via conductors V25 correspond to the via conductors (V2) constituting parts of the comb block parts 24 (241, 242).

Figure 8D:
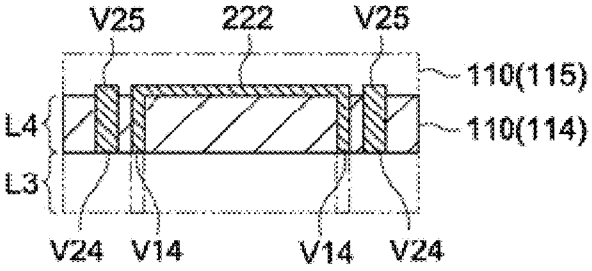

Next, the resist film R3 and seed layer SL3 are removed, and an insulation layer 115 covering the via conductors V25 and connecting conductors 222 is formed (FIG. 8D). While not illustrated, this is followed by a repeat of the steps including polishing the surface of the insulation layer 115 until the tips of the via conductors V25 are exposed, as well as forming a seed layer, forming a resist pattern, and applying electroplating, etc., to produce the electrode layer L5 shown in FIGS. 4 and 5E.

Thereafter, the conductor layers 301, 302 are formed on the comb block parts 24 (241, 242) exposed to the surface (bottom face 102) of the insulation layer 115, after which the first and second external electrodes 31, 32 are formed, respectively.

[Structure of this Embodiment]

Given the trend for smaller components in recent years, ensuring coil properties is becoming increasingly difficult. To be specific, the properties of a coil component are affected significantly by the size, shape, etc., of its built-in coil part, and typically the greater the opening of the coil part, the higher the resulting inductance properties become.

However, making the component smaller limits the size of the insulator part, and consequently the opening area of the coil part decreases and the inductance properties become lower. On the other hand, while the opening area of the coil part is maximized by designing the corners of the opening as square, as illustrated by the basic constitution in FIG. 2, this causes the electrical current to concentrate at the corners of the opening and thus increases the conductor loss, preventing a high Q-value from being achieved.

Accordingly, the present invention optimizes the dimension ratio of the opening of the coil part in order to make the coil component smaller while still improving its properties.

Constitutional Example 1

Figure 9:
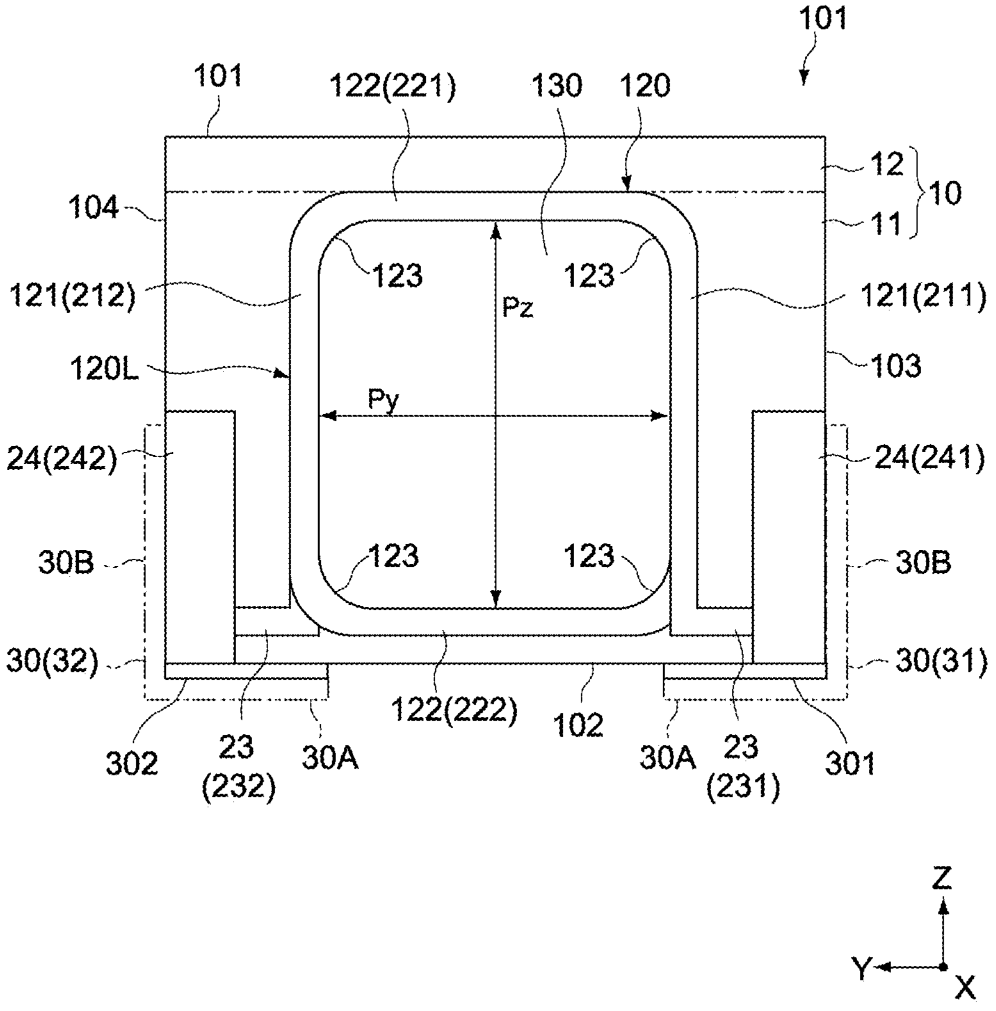
FIG. 9 is a schematic perspective side view showing a coil component pertaining to an embodiment of the present invention.

FIG. 9 is a schematic perspective side view showing the coil component 101 pertaining to this embodiment.

The following primarily explains those parts constituted differently from the coil component 100 pertaining to the basic constitution shown in FIG. 2, and parts constituted similarly to the basic constitution are denoted using similar symbols and not explained, or explained only briefly.

The coil part 120L in this embodiment has an opening part 130 constituted by straight line parts 121, 122 and curved line parts 123. The opening part 130 is formed so that its shape as viewed from one axis direction (X-axis direction) becomes approximately rectangular. One straight line part 121 is constituted by the first and second columnar conductors 211, 212, while the other straight line part 122 is constituted by the first and second connecting conductors 221, 222. The curved line parts 123 are provided at the four corners of the opening part 130, respectively.

Because the corners of the opening part 130 are constituted by the curved line parts 123, the L-value (inductance) of the coil part 120L is lower compared to the coil component according to the basic constitution whose corners are square (FIG. 2). However, shaping the corners of the opening part 130 with curved lines reduces concentration of electric current at the corners, which in turn lessens the electrical resistance and consequently the Q-value will improve.

It should be noted that a “corner” typically means the angled part positioned at each point of intersection between the lines extended from the two straight line parts 121, 122 that are adjacent to each other, where the angle formed by the extended lines need not be square (90 degrees), but it may also be a sharp angle of less than 90 degrees or obtuse angle over 90 degrees.

Typically, the coil part is formed so that, when the two straight line parts 121, 122 are connected by conductors of curved-line shape, it remains inside the points of intersection between the lines extended from the two straight line parts 121, 122. The positions where the curved line parts 123 are formed that connect the two straight line parts 121, 122 using these conductors of curved-line shape, are referred to as “corners.”

Here, the “curved-line shape” refers to both a shape having its center on the inner side of the point of intersection between the two straight line parts 121, 122 when the curved line is formed as an arc or elliptic arc (the center of an ellipse is the point of intersection between its long axis and short axis), and a shape having its center on the outer side of the point of intersection between the two straight line parts 121, 122; however, a shape having its center on the outer side of the point of intersection between the two straight line parts 121, 122 is not desirable, because it clearly has a smaller L-value and improvement of the Q-value is not expected, either.

The curved line parts 123 are not limited to those formed by smooth curved lines, and they may be formed as steps with height differences. Or, the curved line parts 123 may include a tapered or angled part that inclines at an angle, or the entire curved line parts 123 may be such tapered/angled parts (refer to FIG. 17). Since the opening part 130 is an approximate rectangle, the tapered/angled or stepped straight line parts can be differentiated from the straight line parts 121, 122, etc., used for forming an approximate rectangle.

The idea is that these straight line parts that do not constitute the approximate rectangle are included in the curved line parts 123. In other words, the straight line parts 121, 122 are the straight lines forming the respective sides of the approximate rectangle of the opening part 130, while the curved line parts 123 include curved lines and straight lines not forming the respective sides of the approximate rectangle of the opening part 130.

The inventors of the present invention measured the L-value and Q-value by changing the proportion or ratio of the line length of the curved line parts 123 with respect to the line length of the inner periphery of the opening part 130 (hereinafter also referred to as “percentage of curved line parts”). The results are shown in FIGS. 10 and 11.

Figure 10:
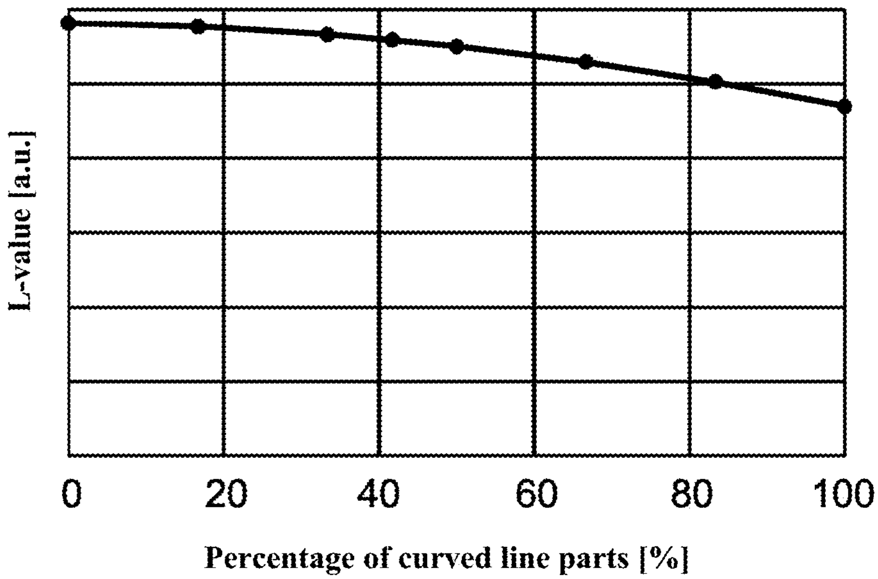
FIG. 10 is a diagram showing the relationship between the percentage of curved line parts and the L-value in Constitutional Example 1 of the coil component.
Figure 11:
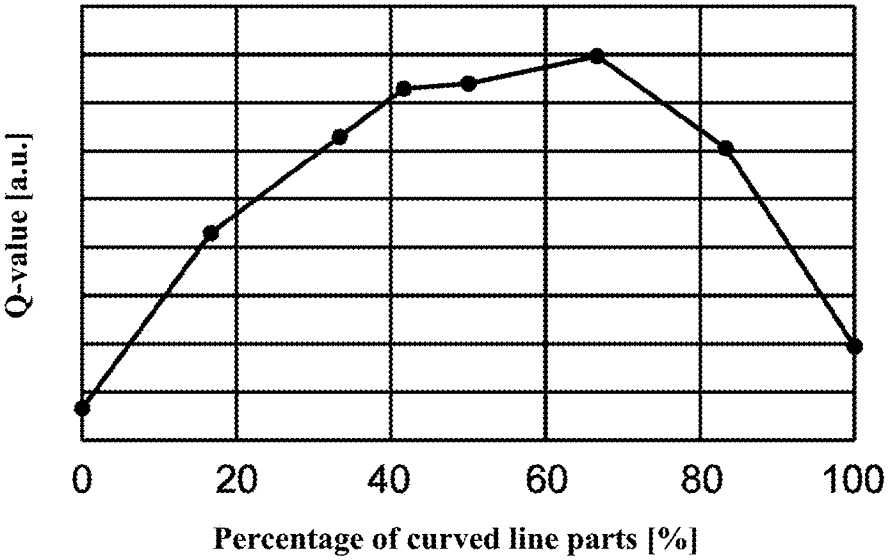
FIG. 11 is a diagram showing the relationship between the percentage of curved line parts and the Q-value in Constitutional Example 1 above.

FIG. 10 presents a simulation result showing the relationship between the percentage of curved line parts of the opening part 130 of the coil part 120L, and the L-value (L-value at 0.5 GHz in this example). FIG. 11 presents a simulation result showing the relationship between the percentage of curved line parts of the coil part 120L, and the Q-value (Q-value at 1.8 GHz in this example).

Here, the component size (length×width×height) of the coil component 101 was set to 250 μm×125 μm×200 μm, and for the opening size of the opening part 130, the length in length direction Py and length in height direction Pz were set to 120 μm, respectively (120 μm×120 μm). The widths (X-axis direction dimensions) and thicknesses of the conductors (straight line parts 121, 122 and curved line parts 123) constituting the coil part 120L were all set to 10 μm.

When calculating the percentage of curved line parts, a virtual reference rectangle 130*s* which is inscribed in the opening part 130, has square corners, and lies in parallel with the XY plane, is set. Then, for example, the line length of the curved line parts 123 is obtained from the line length of the reference rectangle 130*s* and the ratio thereto of the line length of the inner periphery of the straight line parts 121, 122 overlapping with the reference rectangle 130*s*, in order to calculate the percentage of the curved line parts 123 with respect to the inner periphery of the opening part 130.

As shown in FIG. 10, the area of the opening part 130 decreases, and therefore the L-value of the coil part tends to decrease, as the percentage of curved line parts increases. On the other hand, the Q-value rises as the percentage of curved parts increases, and peaks at the maximum value near approx. 65%, as shown in FIG. 11. To optimize both the L-value and the Q-value, the inventors of the present invention evaluated the coil properties of the coil component 101 based on the product of the L-value and Q-value (product of L×Q) of the coil part 120L, and obtained the result shown in FIG. 13.

Figure 13:
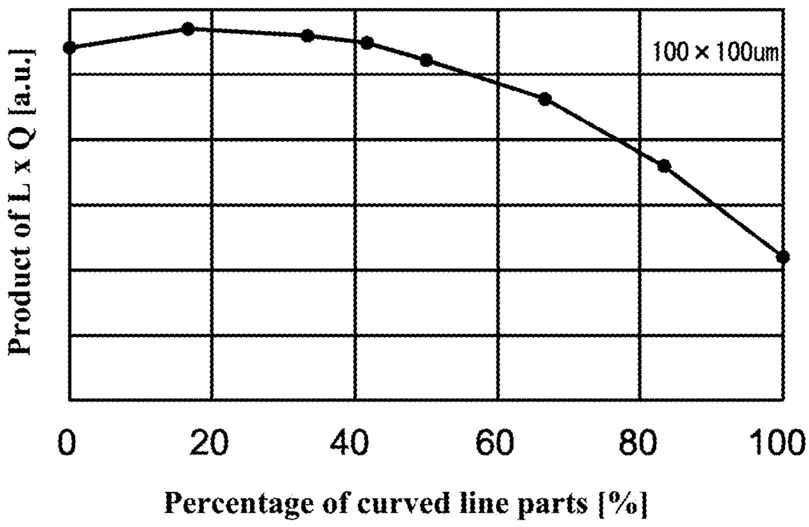
FIG. 13 is a diagram showing the relationship between the percentage of curved line parts and the product of L×Q in Constitutional Example 1 above.

FIG. 13 presents a simulation result showing the relationship between the percentage of curved line parts of the coil part, and the product of L×Q. As shown in FIG. 13, the product of L×Q of the coil part 120L increases to a certain range, and then changes course and starts to decrease, as the percentage of curved line parts of the opening part 130 increases. This indicates that, because the Q-value increases more than the L-value decreases as the percentage of curved line parts of the opening part 130 increases, excellent coil properties can be obtained in the range where the percentage of curved line parts is no more than a prescribed level (no more than approx. 40% in this example), compared to when there are no curved line parts (0% in FIG. 13). It can also be added that, within this range, the range where the percentage of curved line parts is greater than the peak of the product of L×Q (=20% or more but no more than 40% in this example) is particularly preferable if the high-frequency characteristics are important, because the drop in Q-value is small.

As described above, the coil component 101 in this embodiment is constituted so that the line length of the curved line parts 123 along the inner periphery of the opening part 130 of the coil part 120L is no more than 40% of the line length of the inner periphery of the opening part 130. This way, excellent coil properties can be ensured, as shown in FIG. 13. According to this embodiment, the coil component can be made smaller while still ensuring desired coil properties, by setting the aforementioned percentage of curved line parts of the coil part 120L to no more than 40%.

As for the method for manufacturing the coil part 120L having the curved line parts 123, electrode layers to which the curved line parts 123 belong are formed in multiple sections in the steps of manufacturing the coil component pertaining to the basic constitution as explained by referring to FIGS. 4 and 5, for example. The number of electrode layer sections is not limited in any way, but the greater the number of sections, the smoother the formed curved line parts will become while the number of steps will increase. According to the size of the curved line parts 123 (percentage of curved line parts), therefore, the curved line parts can be formed as steps, or a tapered/angled part that inclines at an angle can be incorporated at least partially into the curved line parts, or other measure can be taken, to prevent the number of steps from increasing.

Constitutional Example 2

Figure 14:
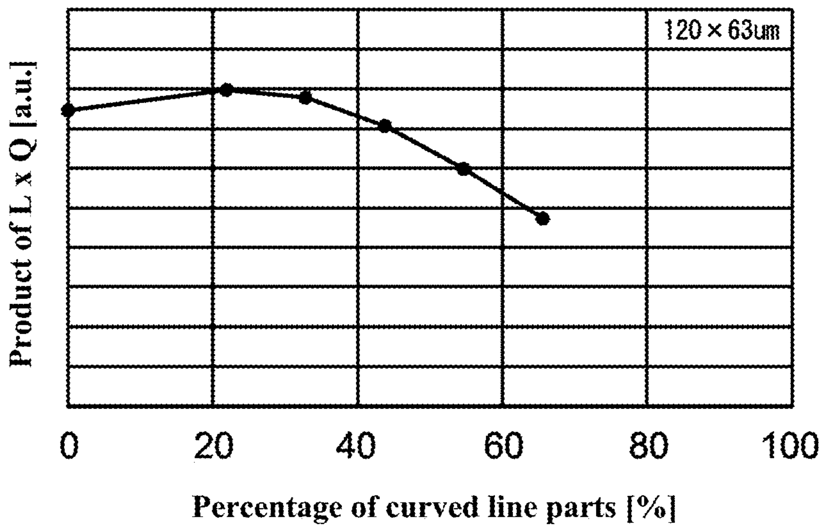
FIG. 14 is a diagram showing the relationship between the percentage of curved line parts and the product of L×Q in Constitutional Example 2 of the coil component.

FIG. 14 presents a simulation result showing the relationship between the percentage of opening part of the coil part 120L and the product of L×Q, measured in the same manner as described above, based on the opening size (Px×Pz) of the opening part 130 being 120 μm×63 μm (component size: 250 μm×125 μm×100 μm).

As shown in FIG. 14, excellent coil properties are also ensured in this constitutional example by setting the aforementioned percentage of curved line parts of the coil part 120L to no more than 40%, compared to when there are no curved line parts (0% in FIG. 14). It can also be added that, within this range, the range where the percentage of curved line parts is greater than the peak of the product of L×Q (=20% or more but no more than 40% in this example) is particularly preferable if the high-frequency characteristics are important, because the drop in Q-value is small. As a result, the coil component can be made smaller while still ensuring desired coil properties.

Constitutional Example 3

Figure 15:
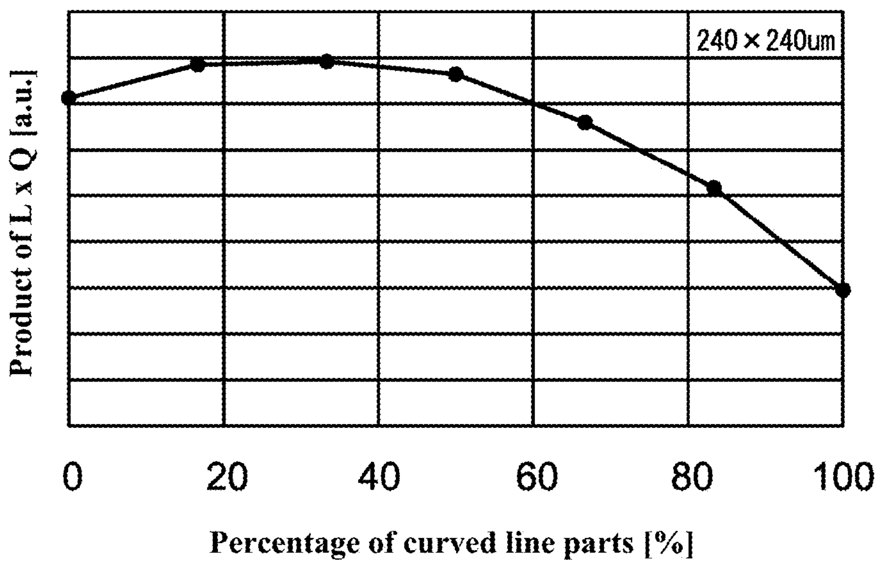
FIG. 15 is a diagram showing the relationship between the percentage of curved line parts and the product of L×Q in Constitutional Example 3 of the coil component.

FIG. 15 presents a simulation result showing the relationship between the percentage of opening part of the coil part 120L and the product of L×Q, measured in the same manner as described above, based on the opening size (Px×Pz) of the opening part 130 being 240 μm×240 μm (component size: 400 μm×200 μm×300 μm).

As shown in FIG. 15, excellent coil properties are also ensured in this constitutional example by setting the aforementioned percentage of curved line parts of the coil part 120L to no more than 40%, compared to when there are no curved line parts (0% in FIG. 15). It can also be added that, within this range, the range where the percentage of curved line parts is greater than the peak of the product of L×Q (=30% or more but no more than 40% in this example) is particularly preferable if the high-frequency characteristics are important, because the drop in Q-value is small. As a result, the coil component can be made smaller while still ensuring desired coil properties.

It should be noted that, according to this constitutional example, the coil properties (product of L×Q) were higher than when there were no curved line parts (0% in FIG. 15) in the range where the percentage of curved line parts of the coil part 120L was no more than 60%, which is different from Constitutional Examples 1 and 2. This indicates that, when the component size is 250 μm or more but no more than 400 μm in length, and 200 μm or more but no more than 300 μm in height, the coil component can be made smaller while still ensuring desired coil properties, by setting the aforementioned percentage of curved line parts to no more than 60%.

Constitutional Example 4

Figure 16:
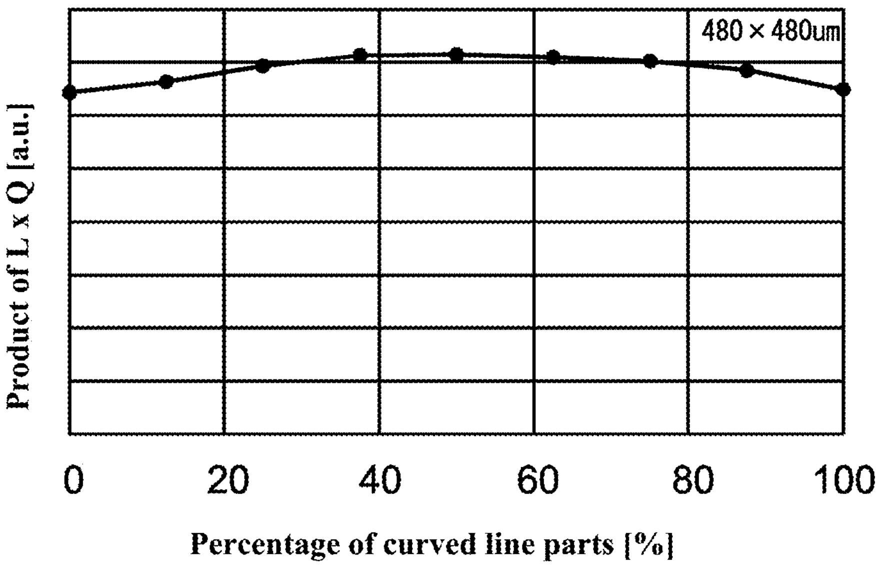
FIG. 16 is a diagram showing the relationship between the percentage of curved line parts and the product of L×Q in Constitutional Example 4 of the coil component.

FIG. 16 presents a simulation result showing the relationship between the percentage of opening part of the coil part 120L and the product of L×Q, measured in the same manner as described above, based on the opening size (Px×Pz) of the opening part 130 being 480 μm×480 μm (component size: 600 μm×300 μm×600 μm).

As shown in FIG. 16, in this constitutional example there is no marked deterioration in the product of L×Q even when the aforementioned percentage of curved line parts of the coil part 120L is changed, and excellent coil properties are ensured at percentages of no more than 90%.

The reason why desired coil properties are ensured when the percentage of opening part is relatively high, as is the case in this constitutional example, is that, because the opening size is greater than in Constitutional Examples 1 to 3, the L-value decreases relatively less as the percentage of opening part increases. Particularly in this example, the product of L×Q takes the maximum value in a range near a percentage of curved line parts of 40% to 60%; however, the increase is not significant and the coil properties of the coil component do not change much regardless of which value is chosen, between 0% and 100%, for the percentage of curved line parts.

It should be noted that, from the viewpoint of preventing the number of electrode layers or number of steps needed to form the curved line parts from increasing excessively, the percentage of curved line parts can be set to no more than 60%, or preferably to no more than 40%; this way, a coil component offering excellent coil properties can be manufactured without causing the number of steps to increase.

Constitutional Example 5

Figure 17:
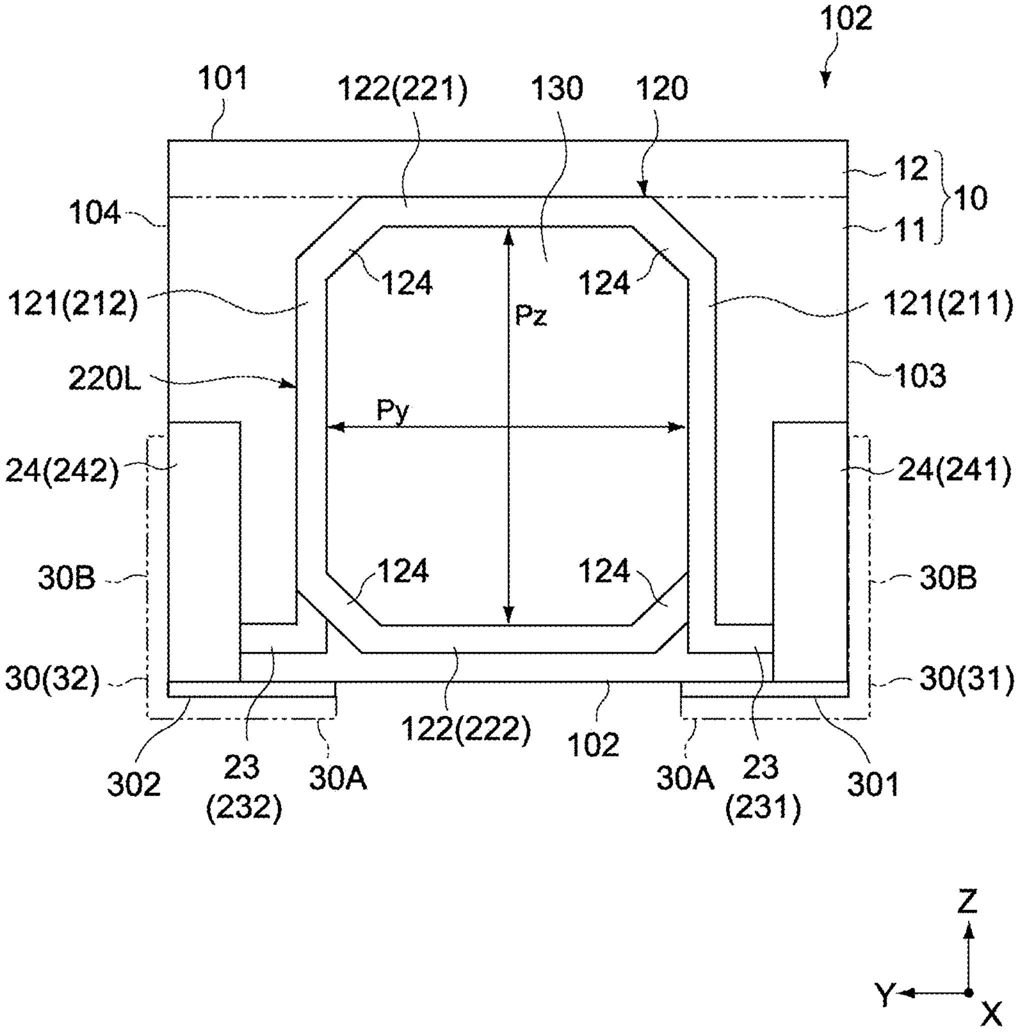
FIG. 17 is a schematic perspective side view showing Constitutional Example 5 of the coil component.

FIG. 17 is a schematic perspective side view showing the coil component 102 pertaining to another embodiment of the present invention.

The following primarily explains those parts constituted differently from the coil component 101 pertaining to Constitutional Example 1 shown in FIG. 9, and parts constituted similarly to Constitutional Example 1 are denoted using similar symbols and not explained or explained only briefly.

In this embodiment, the constitution of the curved line parts 124 is different from that in Constitutional Example 1. To be specific, the coil component 102 in this embodiment is such that its curved line parts 124 at the opening part 130 of the coil part 220L are constituted by tapered/angled parts connecting the straight line parts 121, 122 at the corners of the opening part 130.

This constitutional example also achieves the operations and effects similar to those achieved in each of the aforementioned constitutional examples, and the coil component can be made smaller while still ensuring desired coil properties, by setting the line length of the curved line parts 124 (tapered/angled parts) along the inner periphery of the opening part 130 to no more than 40%, for example, of the line length of the inner periphery of the opening part 130.

Second Embodiment

Figure 18:
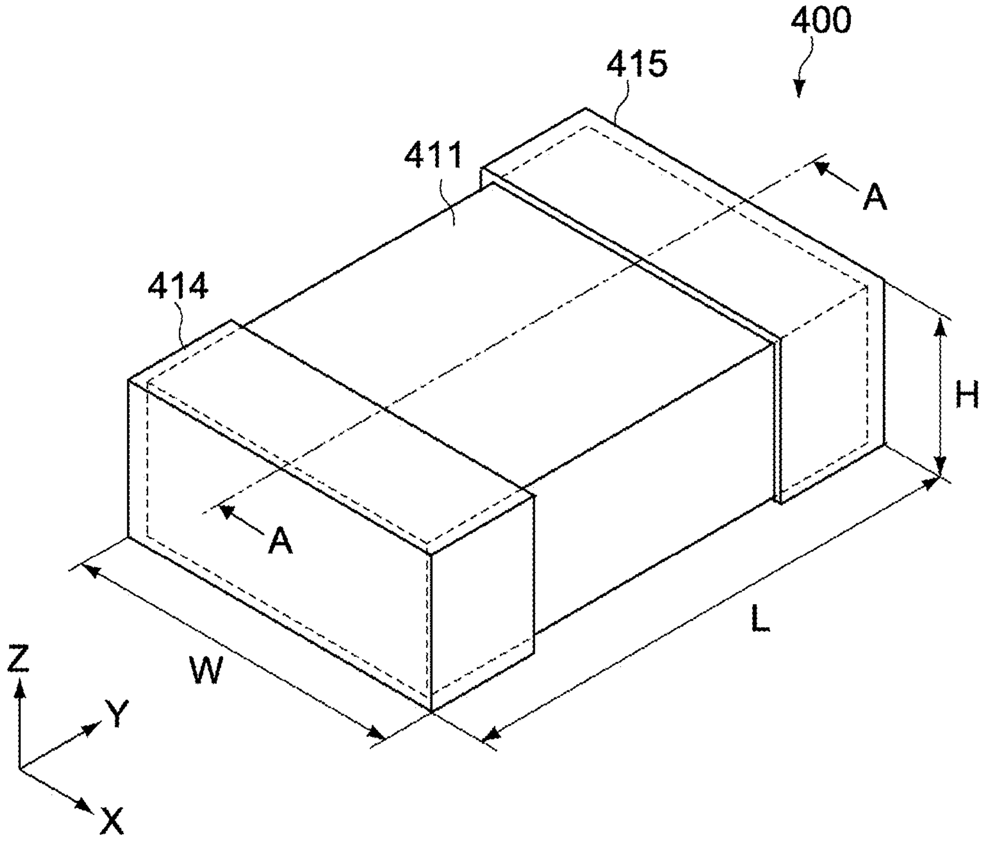
FIG. 18 is a general perspective view of a coil component pertaining to a second embodiment of the present invention.
Figure 19:
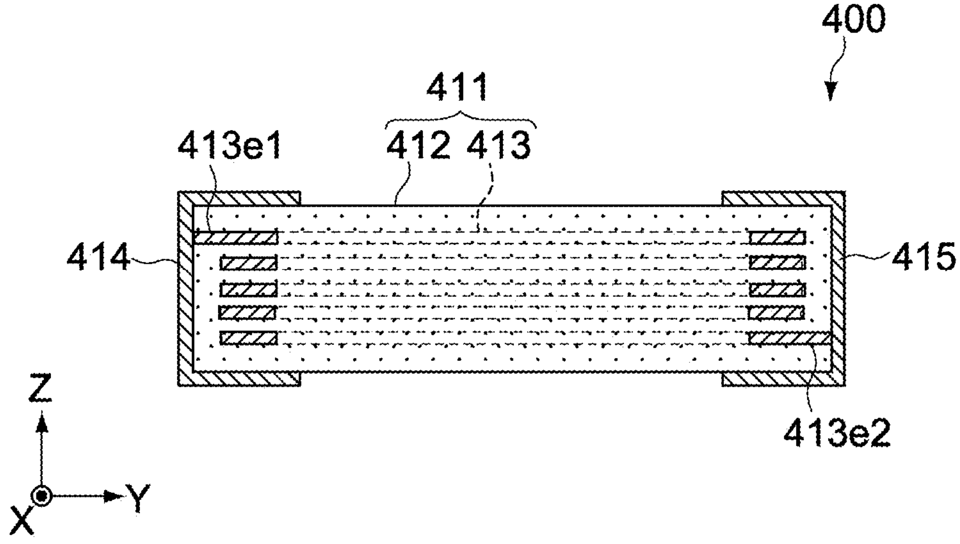
FIG. 19 is a cross-sectional view along line A-A in FIG. 18.

FIG. 18 is a general perspective view of the coil component pertaining to the second embodiment of the present invention, while FIG. 19 is a cross-sectional view along line A-A in FIG. 18.

The coil component in this embodiment is constituted as a multilayer inductor.

The coil component 400 in this embodiment has a component body 411 and a pair of external electrodes 414, 415, as shown in FIG. 18. The component body 411 is formed as a rectangular solid shape having a width W in the X-axis direction, length L in the Y-axis direction, and height H in the Z-axis direction. The pair of external electrodes 414, 415 are provided on the two end faces of the component body 411 that are facing each other in the long-side direction (Y-axis direction).

The dimension of each part of the component body 411 is not limited in any way, but in this embodiment, its length L is 100 μm or more but no more than 600 μm, width W is 50 μm or more but no more than 300 μm, and height H is 50 μm or more but no more than 600 μm.

Figure 20:
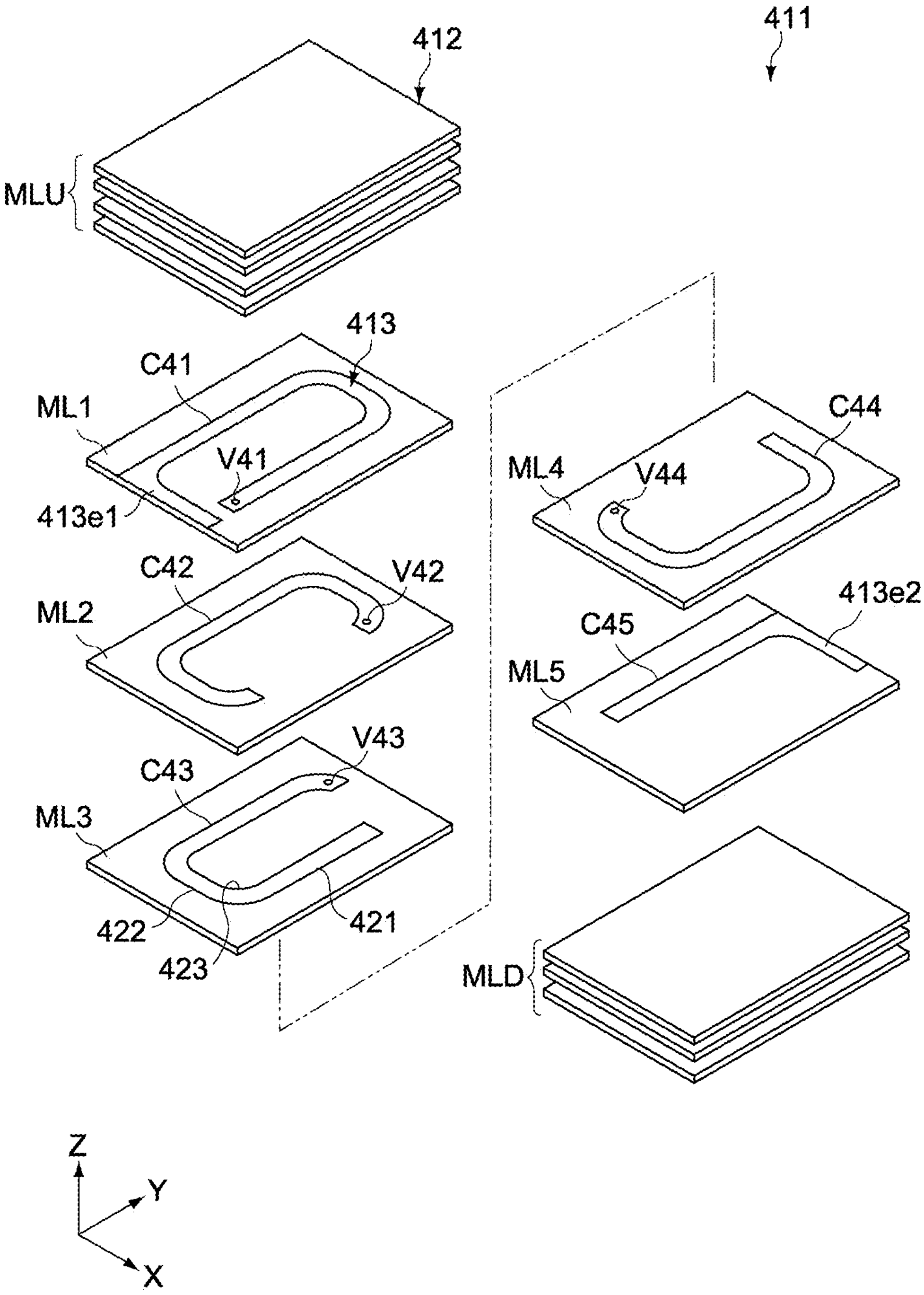
FIG. 20 is an exploded perspective view of the component body of the coil component in FIG. 18.

The component body 411 has an insulator part 412 of rectangular solid shape, and a spiral coil part 413 placed inside the insulator part 412, as shown in FIGS. 19 and 20.

The insulator part 412 is structured in such a way that multiple insulator layers MLU, ML1 to ML5, MLD are integrally stacked in the height direction (Z-axis direction). The insulator layers MLU, MLD constitute the top and bottom cover layers of the insulator part 412. The insulator layers ML1 to ML5 respectively have conductor patterns C41 to C45 that constitute the coil part 413. The insulator layers MLU, ML1 to ML5, MLD are each constituted by a magnetic material having electrical insulation property, and although they are typically constituted by magnetic powders of ferrite, FeCrSi or other alloy magnetic grains, they may be constituted by a non-magnetic material such as glass ceramic grains or titanium oxide, zirconium oxide or other oxide grains. The conductor patterns C41 to C45 are typically produced using an Ag paste or other conductive paste.

As shown in FIG. 20, the conductor patterns C41 to C45 constitute parts of the coil which is wound around the Z-axis, and as they are electrically connected to each other in the Z-axis direction by via holes V41 to V44, the coil part 413 is formed. The conductor pattern C41 in the insulator layer ML1 has lead ends 413*e*1 that electrically connect to one external electrode 414, and the conductor pattern C45 in the insulator layer ML5 has lead ends 413*e*2 that electrically connect to the other external electrode 415.

As shown in FIG. 20, the coil part 413 has an opening part constituted by straight line parts 421, 422 and curved line parts 423 (refer to the insulator layer ML3). This opening part is formed so that its shape as viewed from one axis direction (Z-axis direction) becomes an approximate rectangle. One straight line part 421 constitutes the long side of the opening part, while the other straight line part 422 constitutes the short side of the opening part. The curved line parts 423 are provided at the four corners of the opening part, respectively. The conductor patterns C41 to C45 each have at least one of the straight line parts 421, 422 and at least one curved line part 423.

Figure 12:
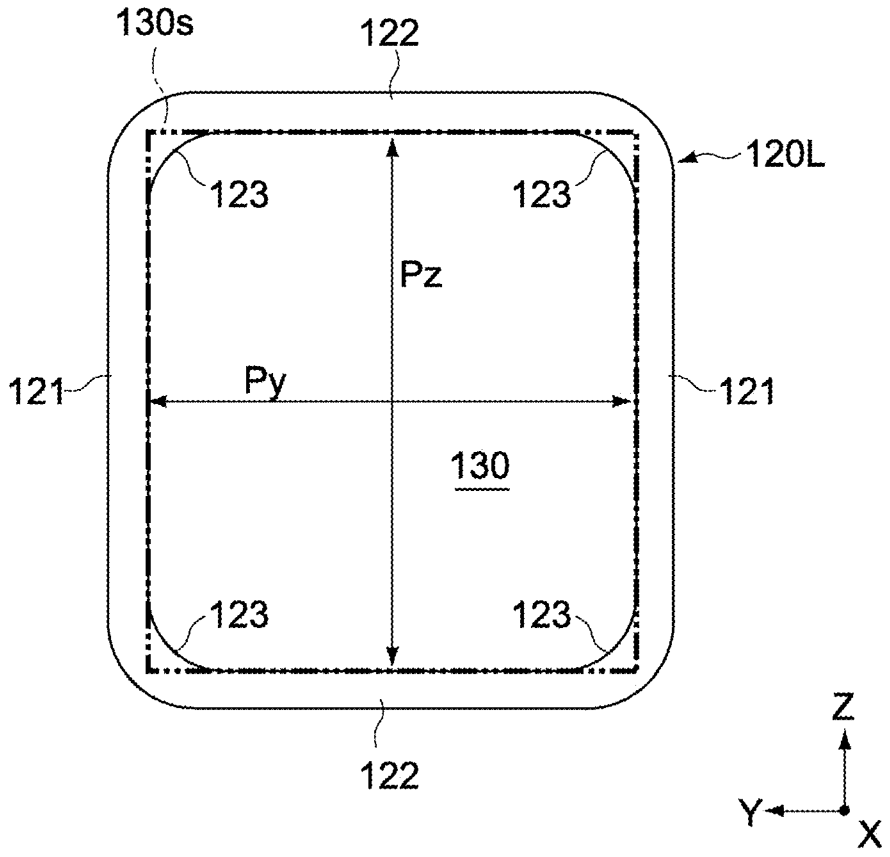
FIG. 12 is an explanation drawing for calculating the percentage of curved line parts.

The coil component 400 in this embodiment is constituted so that the line length of the curved line parts 423 along the inner periphery of the opening part of the coil part 413 is no more than 40% of the line length of the inner periphery of the opening part, just like in the first embodiment. This way, the coil component can be made smaller while still ensuring desired coil properties, just like the first embodiment. It should be noted that the aforementioned percentage of curved line parts can be calculated by the same method used in the first embodiment (refer to FIG. 12).

Next, an example of a method for manufacturing the coil component 400 as constituted above, is explained.

First, an insulator material powder is dispersed together with a binder, and the dispersed powder is processed into a sheet shape using the doctor blade method, etc., as deemed appropriate. Next, via holes are opened in the sheet at necessary positions using a laser or other appropriate means. Additionally, conductors are formed on the sheet at necessary positions, in shapes that will become coil winding parts or lead parts, using a conductor paste prepared by dispersing Ag, etc., in a vehicle. (The terms "binder" and "vehicle" used above both refer to a mixture of resin component and solvent component, and although each term is customarily used differently according to the application, there is no strict distinction between the two terms based on the composition of the applicable substance.) The conductors can be formed by selecting the screen printing method, transfer method, sputtering or other thin-film method, plating, etc., as deemed appropriate. The via holes may be filled with a conductor material when conductors are formed in shapes that will become coil winding parts or lead parts, or the via holes may be filled with a conductor material independently. Instead of filling the via holes with a conductor material, they may be allowed to be filled when the conductor material for forming the conductors in shapes that will become coil winding parts or lead parts, deforms, etc., at the time of pressure bonding.

Sheets on which conductors have been formed as described above, and dummy sheets on which no conductors have been formed, are laid over (stacked) in a prescribed order and then pressurized (pressure-bonded) at a necessary temperature and pressure. If multiple coils have been produced in a collective form, it is divided into individual coils using a dicer, etc., as deemed appropriate, after which the coils are put through a two-hour binder removal process at a prescribed ambience and temperature, such as 500° C. in standard atmosphere, followed by a heat treatment at a prescribed temperature and ambience. The heat treatment may cause grain growth due to high temperature depending on the type of insulator material, in which case such heat treatment is often called "sintering." If the insulator material is pure iron, Fe—Si—Cr alloy, Fe—Si—Al alloy, Fe—Si—Cr—Al alloy, etc., then grain growth does not occur and the oxide films on the surfaces of individual insulator material powder grains bond together instead. In this case, the heat treatment temperature is 700° C., for example, for 1 hour, and the heating ambience is standard atmosphere, for example. If the insulator material is ferrite, glass ceramic, etc., sintering is performed under the conditions of 900° C. for 1 hour, and ambient condition of standard atmosphere, for example. The heat treatment may be performed at the same time with the binder removal process.

Thereafter, external electrodes are produced in desired shapes as deemed appropriate so that they will be connected to the exposed parts of the lead part conductors on the end faces. Barreling, etc., may be performed before the formation of external electrodes, as deemed appropriate, to achieve better connection between the exposed parts of the lead part conductors on the end faces and the external electrodes. External electrodes may be formed by applying and then heating (baking) a conductor paste prepared by dispersing Ag, etc., together with a vehicle, and also with a glass component in some cases, or by applying and thermally curing a conductive resin paste, or alternatively thin films may be formed by the sputtering method, etc., as electrodes. The external electrodes are then plated with Ni, Sn, etc., as necessary, to obtain a multilayer coil component.

The foregoing explained embodiments of the present invention; it goes without saying, however, that the present invention is not limited to the aforementioned embodiments and that various modifications can be added.

For example, the above embodiments, under Constitutional Examples 1 to 4, were explained by citing an example where the height dimension of the coil component was equal to or less than its length dimension; however, this is not necessarily the case, and the height dimension of the coil component may be greater than its length dimension. In this case, operations and effects similar to those mentioned above can also be achieved by optimizing the percentage of curved line parts along the inner periphery of the opening part.

In the above embodiments, a method of stacking the insulator layers and via conductors one by one from the top face side toward the bottom face side of the coil component was explained; however, this is not necessarily the case, and the insulator layers and via conductors may be stacked one by one from the bottom face side toward the top face side.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A coil component, comprising:

an insulator part constituted by an electrical insulation material and being no more than 600 μm long in a length direction and no more than 600 μm high in a height direction; and a coil part wound around one axis spirally in the one axis direction perpendicular to the length direction and the height direction and embedded inside the insulator part, wherein a central part which is inside the winding of the coil part as viewed from the one axis direction is constituted by the electrical insulation material, and an external part which is outside the winding of the coil part as viewed from the one axis direction is constituted by the said electrical insulation material, wherein the central part of the coil part is an opening part when solely the coil part is viewed from the one axis direction, wherein the opening part is defined by an inner periphery of the winding of the coil part, wherein the inner periphery of the opening part is constituted by straight line parts and chamfered-corner line parts and whose shape is a closed approximate quadrangle formed by four sides each constituted by a portion of the straight line parts and a portion of the chamfered-corner parts as viewed from the one axis direction, wherein a line length of the chamfered-corner line parts along the inner periphery of the opening part is 20% or more but no more than 40% of a line length of the inner periphery of the opening part, and wherein each chamfered-corner line part is an angled part positioned at each point of intersection between lines extended from the straight line parts that are adjacent to each other, where an angle formed by the extended lines is a sharp angle of less than 90 degrees or an obtuse angle over 90 degrees.

2. The coil component, according to claim 1, wherein the chamfered-corner line parts are provided at all corners of the inner periphery of the opening part.

3. The coil component according to claim 1, wherein the coil part is wound around an axis running parallel with a width direction of the insulator part.

4. The coil component according to claim 3, wherein the insulator part has a dimension in the height direction equal to or greater than a dimension in the length direction.

5. The coil component according to claim 1, wherein the insulator part is constituted by a non-magnetic material.

6. The coil component according to claim 1, wherein the insulator part is no more than 400 μm long and no more than 300 μm high.

7. The coil component according to claim 6, wherein the line length of the chamfered-corner line parts along the inner periphery of the opening part is 30% or more but no more than 40% of the line length of the inner periphery of the opening part.

8. The coil component according to claim 1, wherein the insulator part is no more than 250 μm long and no more than 200 μm high.

9. The coil component according to claim 1, wherein the electrical insulation material is a resin.

10. The coil component according to claim 1, wherein an opening size of the inner periphery of the opening part of the coil part is less than 480 μm in the length direction and less than 480 μm in the height direction.

11. The coil component according to claim 1, wherein the insulation part is constituted by a non-magnetic filler and a resin.

12. The coil component according to claim 1, further comprising a pair of external electrodes electrically connected to the coil part, wherein the pair of external electrodes are disposed on end faces of the insulation part which face each other in the length direction.

* * * * *